Jan. 17, 1967  C. E. ADAMS ETAL  3,299,153
NAPHTHENIC ISOMERIZATION PROCESS WITH SYNTHETIC MORDENITE
Filed May 6, 1964
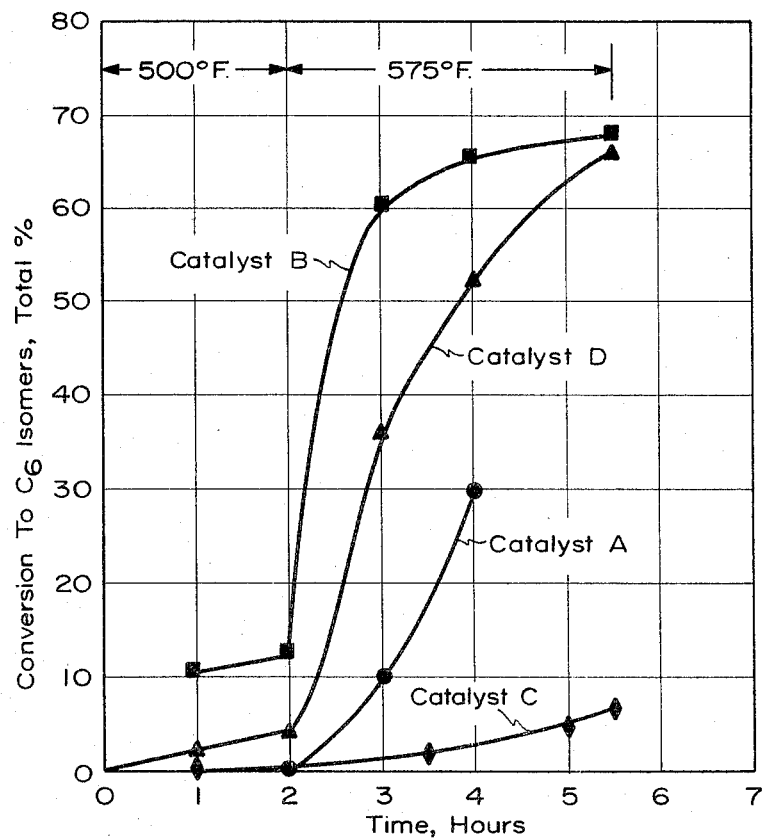
CLARK EDWARD ADAMS
CHARLES NEWTON KIMBERLIN, JR. INVENTORS
BY Reuben Miller
PATENT AGENT 3,299,153
NAPHTHENIC ISOMERIZATION PROCESS WITH
SYNTHETIC MORDENITE
Clark Edward Adams and Charles Newton Kimberlin, Jr., Baton Rouge, La., assignors to Esso Research and Engineering Company, a corporation of Delaware
Filed May 6, 1964, Ser. No. 365,390
15 Claims. (Cl. 260—666)

This invention relates to the isomerization of hydrocarbons using synthetic mordenite as the isomerization catalyst. Particularly, it relates to the isomerization of paraffinic and naphthenic hydrocarbons.

The isomerization of normal paraffinic hydrocarbons using conventional catalysts such as the metal halides, e.g. aluminum chloride, is well known. The isomerization of naphthenic hydrocarbons, on the other hand, particularly at moderate temperatures, has generally proved more difficult and an effective isomerization process for naphthenes has been desired for some time. In accordance with the present invention, it has been discovered that crystalline alumino-silicate zeolites of the synthetic mordenite variety are extremely effective isomerization catalysts for both paraffinic and naphthenic hydrocarbons. While such crystalline alumino-silicate zeolites, commonly referred to as "molecular sieves," have recently gained wide acceptance in various hydrocarbon conversion processes, the unique ability of the synthetic mordenite variety to successfully isomerize paraffinic hydrocarbons, and particularly the more difficultly isomerized naphthenic hydrocarbons, has not been fully appreciated. Thus, for example, in U.S. Patent 2,971,904, various hydrocarbon conversion processes employing these crystalline zeolite materials are described, such as hydroforming, hydroisomerization, dehydrogenation, aromatization, cracking, and the like. However, the patentees of U.S. 2,971,904 were not aware of the isomerization activity of synthetic mordenite nor its particular effectiveness for the isomerization of naphthenic hydrocarbons. It has thus been found in the present invention that the synthetic mordenite variety of these crystalline alumino-silicate zeolitic materials is a markedly superior isomerization catalyst compared to the other commonly accepted and widely used forms such as the synthetic faujasite variety, sometimes referred to as "Type Y" or "Type X."

The synthetic mordenite type zeolite employed in the practice of the present invention is to be distinguished from the naturally occurring mineral mordenite. The synthetic mordenite variety utilized in the present invention exhibits ability to adsorb cyclics, aromatics, naphthenes, and isoparaffins, and may be characterized as a mordenite type zeolite having the ability to adsorb at least 1.5 wt. percent of benzene in the sodium form or 5.0 wt. percent of benzene in the hydrogen form at a temperature of 205° F. and a pressure of 0.5 atmosphere. These mordenite zeolites employed in the practice of the present invention can be chemically represented by the following formula:

$$0.9 \pm 0.2 : Me_{2/n}O : Al_2O_3 : XSiO_2 \text{ (anhydrous form)}$$

wherein Me is selected from the group consisting of metal cations and hydrogen-containing cations, n is the cation valence, and X is a number from about 9 to 20, preferably about 9 to 11, and usually about 10. While this molar formula also represents naturally occurring mordenite, the naturally occurring variety normally fails to show the adsorptive affinity for cyclics and aromatics as previously indicated. The mordenite type zeolites employed in the practice of the present invention are commercially available from the Norton Company of Worcester, Massachusetts, and have been described in the literature, e.g. Chemical and Engineering News, March 12, 1962. They are believed to have an effective pore diameter in the range of about 6 to about 10 A. The mordenite zeolite is normally produced or supplied in its sodium form and must usually be treated to reduce its sodium content in order to serve as an effective catalyst. The sodium content is usually reduced to less than about 10 wt. percent, preferably less than about 5 wt. percent, more preferably less than about 1 wt. percent, by cation exchange with various metal salts, such as magnesium, calcium, aluminum, and the rare earths. Alternatively and preferably, the sodium content is reduced by exchange with a hydrogen-containing cation, e.g. hydrogen ion or ammonium ion. When ammonium ion is employed, the resulting ammonium derivative is decomposed to the hydrogen form of the zeolite upon calcination. The hydrogen form of the synthetic mordenite described above will therefore be the preferred form for the purposes of the present invention. The base exchange step with the hydrogen-containing cation is usually conducted at temperatures of 50° to 150° F. by conventional base exchange procedures using a suitable salt of the cation.

While the above-described synthetic mordenite, preferably in the hydrogen form, can be utilized effectively for the isomerization of the paraffinic and naphthenic hydrocarbons herein contemplated, it will be still more particularly preferred to impregnate the mordenite type zeolite with a hydrogenating component, preferably a platinum group metal, most preferably palladium. This impregnation is conveniently accomplished by treating the mordenite zeolite with a solution of a platinum group metal compound, such as a palladium salt, e.g. ammoniacal palladium chloride, in sufficient quantity to produce a product containing 0.05 to 5.0, preferably 0.1 to 2.0, wt. percent of the platinum group metal. After contacting the mordenite zeolite with the solution of the platinum group metal compound, the resulting composition is treated to reduce the metal at least in part to a metallic state. This is normally done by heating in the presence of hydrogen gas to a temperature of 600° to 1000° F., preferably 700° to 900° F.

Suitable feedstocks for the purposes of the present invention will contain normal paraffinic hydrocarbons or naphthenic hydrocarbons or mixtures thereof. The normal paraffinic hydrocarbons will suitably have about 4 to 12 carbon atoms in the molecule and may be exemplified by normal pentane, normal hexane, normal heptane, and normal octane. While the feed may substantially comprise a purified normal paraffinic hydrocarbon stream, it is also contemplated that mixtures of various paraffinic hydrocarbons be employed, and that other hydrocarbons commonly found in conventional petroleum hydrocarbon streams be present. The feed stream can, for example, comprise a refinery hexane cut or a light naphtha feed which initially can contain other hydrocarbon materials such as olefins, aromatic hydrocarbons, etc. Additionally, the feed stream can contain both paraffinic and naphthenic hydrocarbons. As previously mentioned, the advantages of the present invention are made most readily apparent by the successful isomerization of naphthenes which hitherto has generally been unsuccessful, particularly at the moderate temperatures herein contemplated. Thus, the feed stream can also substantially comprise a naphthenic hydrocarbon or mixture of various naphthenic hydrocarbons. Typical examples of naphthenic hydrocarbons which can be successfully isomerized in accordance with the present invention include cyclohexane, cycloheptane, cyclooctane, etc., and their alkyl derivatives, such as methylcyclohexane, methylcyclopentane, ethylcyclohexane, dimethylcyclopentane, etc.

The reaction conditions for the isomerization process of the present invention, will include temperatures in the range of from about 350° to about 800° F., preferably 400° to 600° F., and pressures in the range of from about atmospheric to about 1000 p.s.i.g., preferably atmospheric to 400 p.s.i.g. Generally, the space velocity will be about 0.2 to 5 v./v./hr., preferably 0.5 to 2 v./v./hr. Choice of the particular temperature, pressure and space velocity to be used will be governed by the particular feedstock employed, as well as the desired selectivity to desired product. However, a major determining factor will be the avoidance of substantial cracking to undesirable low molecular weight materials and/or carbonaceous deposits which will foul the catalyst. The amount of cracked products should be maintained below about 20 wt. percent, preferably less than about 10 wt. percent, based on initial feed.

The isomerization process of the invention is conducted in accordance with hydrocarbon conversion procedures which are generally well known in the art. Batchwise, fixed bed, fluidized bed, etc., procedures can be utilized. As an additional embodiment of the present invention, it has been found preferable to conduct the isomerization reaction in the presence of added hydrogen. This has been found to result in an increased isomerization rate and a correspondingly shorter reaction time. The isomerization activity of the mordenite catalyst has been found to be at a maximum in the range of about 200 to 400 p.s.i.g. hydrogen partial pressure. Thus, in addition to the aforementioned temperature and pressure ranges for the isomerization reaction, it will be preferred to conduct the isomerization reaction in the presence of added hydrogen using a hydrogen partial pressure within the range of about 200 to 400 p.s.i.g., preferably 250 to 350 p.s.i.g. Depending upon the total pressure used, it may sometimes be required to conduct the isomerization reaction in the presence of pure hydrogen to the substantial exclusion of other gaseous components. The desirability of added hydrogen will be demonstrated in the examples to follow. However, it will be understood that the present invention is not intended to be limited to this preferred embodiment since successful isomerization can be obtained in a hydrogen-free atmosphere, although the isomerization rate may be somewhat lower.

The various aspects and modifications of the present invention will be made more clearly apparent by reference to the following description and accompanying examples.

EXAMPLE 1

This example illustrates the preparation of catalyst compositions for use in the present invention.

A hydrogen-form mordenite type zeolite, obtained from the Norton Company of Worcester, Massachusetts and believed to have been produced from a synthetic sodium-form mordenite by treatment with dilute acid to replace the sodium ions with hydrogen ions, was employed. It had a silica-to-alumina mole ratio of about 10 and a soda content of about 0.9 wt. percent, and was capable of adsorbing 6.2 wt. percent benzene, 5.0 wt. percent cyclohexane, or 4.6 wt. percent n-hexane at 205° F. and 0.5 atmosphere pressure. The catalyst was then calcined in air by a standard heat treatment which involved 16 hours at 300° F., followed by 1 hour each at 400, 500, 600, 700, 800 and 900° F., followed by 4 hours at 1000° F. This calcined hydrogen-form mordenite zeolite was labeled Catalyst "A."

The above hydrogen-form mordenite was impregnated with palladium, prior to calcining, by adding 200 grams of mordenite to 500 cc. of water and, while stirring, slowly adding a 28% solution of ammonia until the pH of the slurry was raised to 8.0. An ammoniacal palladium chloride solution, prepared by dissolving 6.7 grams of palladium chloride in 100 cc. of a 14% solution of ammonia in water, was added to the above slurry. Stirring was continued for 30 minutes, the mixture was then filtered, and the catalyst was dried at 220° F. The catalyst was then calcined by the procedure used for Catalyst "A" and contained about 2 wt. percent palladium. This catalyst was labeled Catalyst "B."

For purposes of comparison, a synthetic faujasite type zeolite was also employed for the isomerization reactions. The faujasite was prepared by procedures well known in the art and had a silica-to-alumina mole ratio of about 5, a soda content of about 13.5 wt. percent, and a uniform pore diameter of about 13 A. The sodium-form synthetic faujasite was base exchanged with ammonium ion to replace the sodium ions and to reduce the soda content to about 1.0 wt. percent. It was then calcined following the procedures described above to thus form the anhydrous hydrogen-form synthetic faujasite. This catalyst was labeled Catalyst "C."

Catalyst "D" was a hydrogen-form synthetic faujasite similar to Catalyst "C" except that it was impregnated with 2 wt. percent palladium. It was prepared by the procedures used for Catalyst "C" except that before calcination it was impregnated with the desired amount of palladium by treatment with an ammoniacal palladium chloride solution.

The synthetic hydrogen-form mordenite catalysts with and without palladium, i.e. Catalysts "A" and "B," are illustrative of the catalysts used in the present invention. The synthetic hydrogen-form faujasite catalysts, with and without palladium, i.e. Catalysts "C" and "D," are presented merely for the purpose of comparison, and are not intended to be included within the scope of the present invention.

EXAMPLE 2

A number of isomerization reactions were performed in a batchwise manner using a stirred autoclave. The amount of catalyst used in each test ranged from about 9 to 35 wt. percent based on feed. The temperatures and reaction times varied between tests as hereinafter indicated. The procedure followed involved charging the requisite quantities of feed and catalyst to the autoclave and adjusting the temperature and pressure to the desired values. At the end of each test the products were analyzed by gas chromatography using a 20 ft. column of DC 200-silicone oil in a Fischer-Gulf partitioner.

(A) *Isomerization of naphthenic hydrocarbons.*—Several tests were made to demonstrate the ability of the catalysts of the invention to isomerize cyclohexane to methyl cyclopentane. In all cases the catalysts utilized were preheated for 18 hours at 650° F. in air (in addition to the above calcination treatment). Tests were performed with Catalyst "A" (hydrogen-form synthetic mordenite) and Catalyst "B" (2% Pd on hydrogen-form synthetic mordenite). The charge of catalyst varied from about 9 to 35 wt. percent, based on initial feed. The results of these tests are summarized in the following table.

Table I
ISOMERIZATION OF CYCLOHEXANE—AUTOCLAVE TESTS

| Test No. | Reaction Conditions | | | | Product Analysis | |
|---|---|---|---|---|---|---|
| | Weight percent, Cat. | $H_2$ p.s.i.g. at 80° F. | Hours | Temp., ° F. | Cracked Material, percent (Total Sample Basis) | Conversion, percent MCP ($C_6$ Basis) |
| Catalyst "A" H-form Synthetic Mordenite: | | | | | | |
| 1 | 9 | 0 | 2 | 300 | 0 | 0 |
| | 9 | 0 | 2 | 400 | 0 | 2 |
| | 10 | 0 | 3 | 475 | 0 | 30 |
| | 11 | 0 | 3 | 500 | 0 | 60 |
| | 12 | 0 | 1 | 500 | 0 | 63 |
| | 15 | 0 | 1 | 500 | 0 | 63 |
| 2 | 8 | 200 | 2.5 | 300 | 0 | 0 |
| | 9 | 200 | 1 | 400 | 0 | 2 |
| | 11 | 200 | 1 | 500 | 0 | 44 |
| | 12 | 200 | 1 | 500 | 0 | 65 |
| | 17 | 200 | 1 | 500 | Trace | 71 |
| | 24 | 200 | 1 | 600 | 20 | 78 |
| | 35 | 200 | 1 | 600 | 22 | 80 |
| Catalyst "B" 2% Pd on H-form Synthetic Mordenite: | | | | | | |
| 3 | 11 | 200 | 0.5 | 500 | 0 | 27 |
| | 12 | 200 | 0.5 | 525 | Trace | 62 |
| | 13 | 200 | 1 | 550 | 10 | 73 |
| | 13 | 200 | 1 | 500 | 13 | 72 |

As shown in the above table, the synthetic mordenite catalysts used in the present invention are highly effective isomerization catalysts for naphthenes. The effect of added hydrogen and palladium is clearly indicated. Whereas Catalyst "A" successfully isomerized cyclohexane to methylcyclopentane in the absence of hydrogen and without added palladium (Test 1), the rate of isomerization increased when hydrogen was added (Test 2), and increased further when the palladium-mordenite catalyst was used (Test 3). Thus, longer isomerization times were generally required in the absence of hydrogen and palladium in Test 1. When hydrogen was added in Test 2, the required isomerization time to obtain equivalent conversion was substantially decreased. Further, when Catalyst "B" was used in Test 3, which catalyst was identical to Catalyst "A" except for the inclusion of 2% palladium, the required isomerization time was decreased further. It is also to be noted in Table I that the portion of cracked products in the effluent product was negligible with Catalyst "A" below about 600° F. This represents, therefore, an approximate upper temperature limit for operation with a cyclohexane feed, with an approximate lower limit above about 400° F. With Catalyst "B," the proportion of cracked products is seen to be within the accepted limit of below about 20%. It may be concluded from the above data that synthetic mordenite catalysts provide a valuable means for isomerizing naphthenic hydrocarbons at moderate temperatures without substantial cracking. It is believed that this result has not hitherto been readily attainable at these temperatures.

(B) *Isomerization of hexane.*—A comparison of Catalysts "A," "B," "C" and "D" was made by tests similar to those performed above. A hydrogen pressure of 400 p.s.i.g. was utilized throughout at temperatures of 500° F. and 575° F. A catalyst charge of 20 wt. percent on feed was employed. The isomerization rate for the first hour was measured as well as the total conversion after 2 hours at 500° F. plus an additional two hours at 575° F. The catalysts were pretreated and calcined by the procedures described above. The results of these runs are shown in the following table:

Table II
ISOMERIZATION OF HEXANE

| Catalyst | Catalyst Description | Isomerization Rate Percent for First Hour at | | Total Conversion to Hexane Isomers After 2 Hrs. at 500° F. Plus 2 Hrs. at 575° F. | |
|---|---|---|---|---|---|
| | | 500° F. | 575° F. | Cracking, Percent | Isomerization, Percent |
| A | H-form synthetic mordenite | 0 | 10 | 13 | 30 |
| C | H-form synthetic faujasite | 0 | 1 | Trace | 2 |
| B | 2% Pd on H-form synthetic mordenite | 6 | 37 | 7 | 65 |
| D | 2% Pd on H-form synthetic faujasite | 2 | 32 | Trace | 52 |

As indicated in the above table, the isomerization activity of the mordenite catalyst with or without palladium (Catalysts "A" and "B") is significantly greater than the isomerization activity of the faujasite-type catalysts with or without palladium (Catalysts "C" and "D"). Both the isomerization rate and the total isomerization conversion are shown to be substantially higher for the mordenite-type catalyst. The isomerization conversion is expressed as percent isomerization on a $C_6$ basis.

Further runs were performed by a similar procedure and the results are illustrated graphically in the attached figure, which represents average data. Again the superior isomerization ability of the mordenite-type catalysts over the faujasite-type catalysts is demonstrated. Moreover, the increased efficiency obtained by the inclusion of palladium in the synthetic mordenite catalyst is shown in the attached figure by comparison of results obtained with Catalysts "A" and "B." For example, at a reaction time of 3 hours, only 10% isomerization was obtained with Catalyst "A," compared to 60% isomerization obtained with the palladium-containing Catalyst "B."

Various modifications may be made to the present invention. For example, the crystalline mordenite-type catalysts of the present invention may be incorporated into a suitable gel matrix, e.g. a silica-alumina cogel. This may be conveniently accomplished by incorporating the zeolitic crystals into a siliceous hydrogel such as a silica-alumina hydrogel, homogenizing the resulting mixture, and spray-drying the homogenized slurry. The resulting spray-dried composite can contain about 5 to 40 wt. percent of the mordenite zeolite and is particularly useful for such applications as fluidized bed operations.

What is claimed is:

1. An improved process for isomerizing naphthenic hydrocarbons which comprises subjecting said naphthenic hydrocarbons to isomerization conditions in the presence of a catalyst comprising a crystalline synthetic mordenite zeolite containing less than about 10 wt. percent $Na_2O$.

2. The process of claim 1, wherein said mordenite zeolite has a silica-to-alumina ratio in the range of about 9 to 20 and has the ability to adsorb at least 1.5 wt. percent of benzene and 205° F. and 0.5 atmosphere.

3. The process of claim 1, wherein said mordenite zeolite is composited with a platinum group metal.

4. The process of claim 3, wherein said platinum group metal is palladium.

5. The process of claim 1, wherein said mordenite zeolite has been base exchanged with a hydrogen-containing cation.

6. The process of claim 1, wherein said isomerization conditions include a temperature within the range of about 350° to about 800° F., a pressure within the range of about 0 to about 1000 p.s.i.g., and a catalyst charge within the range of about 0.2 to about 5 volumes of feed per volume of catalyst per hour of reaction time, said conditions being selected to maintain the proportion of cracked products below about 20 wt. percent, based on feed.

7. The process of claim 1, wherein said isomerization is conducted in the presence of added hydrogen.

8. The process of claim 1, wherein said naphthenic hydrocarbons comprise cyclohexane.

9. An improved process for isomerizing naphthenic hydrocarbons which comprises subjecting a feed containing said naphthenic hydrocarbons to isomerization conditions in the presence of a catalyst comprising a crystalline synthetic mordenite zeolite having a silica to alumina mole ratio of about 9 to 11 and containing less than about 5.0 wt. percent $Na_2O$.

10. The process of claim 9, wherein said mordenite zeolite has been subjected to base exchange with a hydrogen-containing cation to reduce its $Na_2O$ content.

11. The process of claim 9, wherein said mordenite zeolite is composited with a platinum group metal.

12. The process of claim 11, wherein said platinum group metal is palladium.

13. The process of claim 9, wherein said isomerization conditions include a temperature of about 400° to 600° F., and a pressure of about 0 to 400 p.s.i.g., and wherein the proportion of cracked products is maintained below about 20 wt. percent, based on feed.

14. The process of claim 13, wherein said isomerization is conducted in the presence of added hydrogen.

15. The process of claim 14, wherein the hydrogen partial pressure is about 200 to 400 p.s.i.g.

References Cited by the Examiner

UNITED STATES PATENTS

| | | | |
|---|---|---|---|
| 2,971,904 | 2/1961 | Gladrow et al. | 260—676 |
| 3,069,482 | 12/1962 | Fleck | 260—666 |
| 3,190,939 | 6/1965 | Benesi | 260—683.65 |

DELBERT E. GANTZ, *Primary Examiner.*

V. O'KEEFE, *Assistant Examiner.*